United States Patent [19]
Hazenbroek et al.

[11] Patent Number: 5,067,927
[45] Date of Patent: Nov. 26, 1991

[54] REVOLVING POULTRY THIGH DEBONER

[76] Inventors: Jacobus E. Hazenbroek, Burg de Zeeuwstraat 52, Numansdorp; Bastiaan Verrijp, Burg de Zeeuwstraat 143, Numansdorp, both of Netherlands

[21] Appl. No.: 536,081

[22] Filed: Jun. 11, 1990

Related U.S. Application Data

[63] Continuation of Ser. No. 331,968 April 3, 1989 now abandoned.

[51] Int. Cl.$^5$ .............................................. A22C 25/16
[52] U.S. Cl. ..................................... 452/136; 452/135
[58] Field of Search ........................... 17/11, 1 G, 46; 452/136, 135

[56] References Cited

U.S. PATENT DOCUMENTS

| | | | |
|---|---|---|---|
| 3,261,054 | 7/1966 | Kaplan et al. | 17/11 |
| 3,581,337 | 6/1971 | Tonjum et al. | 17/1 G |
| 3,672,000 | 6/1972 | Martin et al. | 17/11 |
| 4,041,572 | 8/1977 | Martin et al. | 17/46 |
| 4,216,565 | 8/1980 | Volk et al. | 17/1 G |
| 4,327,463 | 5/1982 | Martin | 17/11 |
| 4,377,884 | 3/1983 | Viscolosi | 17/11 |
| 4,639,974 | 2/1987 | Olson | 17/1 G |
| 4,843,682 | 7/1989 | Bowen | 17/11 |

FOREIGN PATENT DOCUMENTS

| | | |
|---|---|---|
| 0270513 | 6/1988 | European Pat. Off. |
| 84/00246 | 11/1984 | PCT Int'l Appl. |
| 2124883 | 2/1984 | United Kingdom |

Primary Examiner—Willis Little
Attorney, Agent, or Firm—Thomas, Kerr & Kayden

[57] ABSTRACT

The deboner (30) carries a plurality of deboning modules (31) in a closed path through a series of processing stations. Each module includes a rotary bone holder (50) which supports one end of a poultry part (106) and a stripper assembly (51) that is moved toward and away from the bone holder. Stripper blades (65, 66) engage the poultry part (106) as the stripper assembly is moved away from the bone holder to strip the meat (107) from the bone (105). As the blades (65, 66) strip the meat from the bone, the rotary bone holder is rotated by its sprocket (83) engaging sprocket turning protrusions (93).

14 Claims, 5 Drawing Sheets

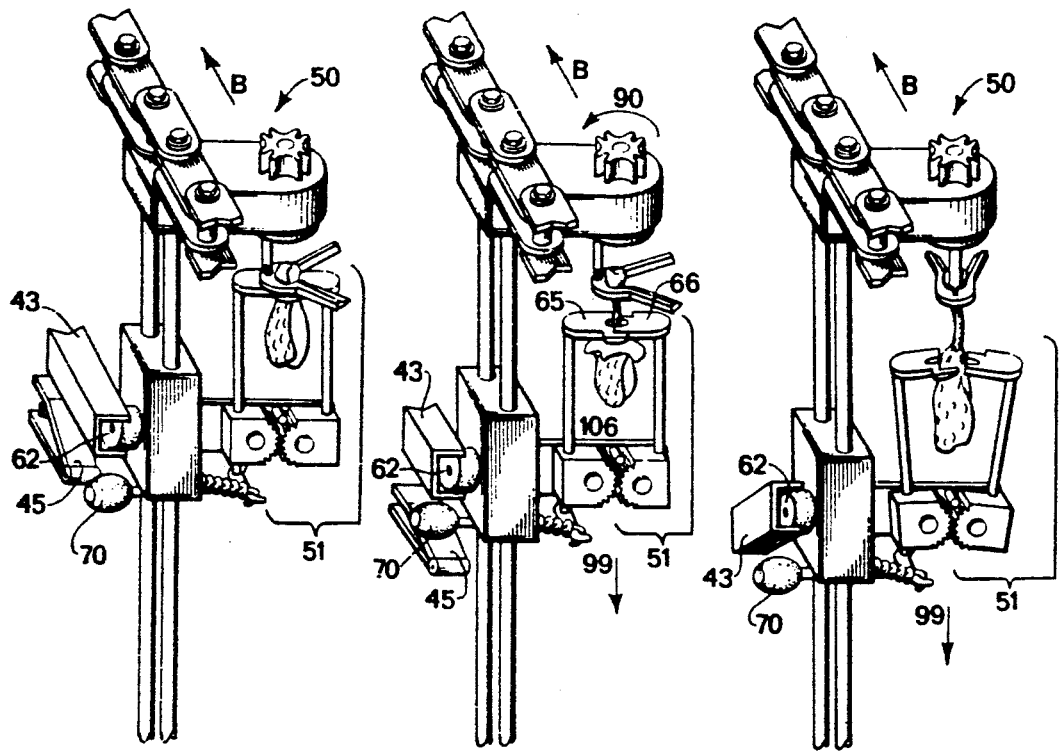
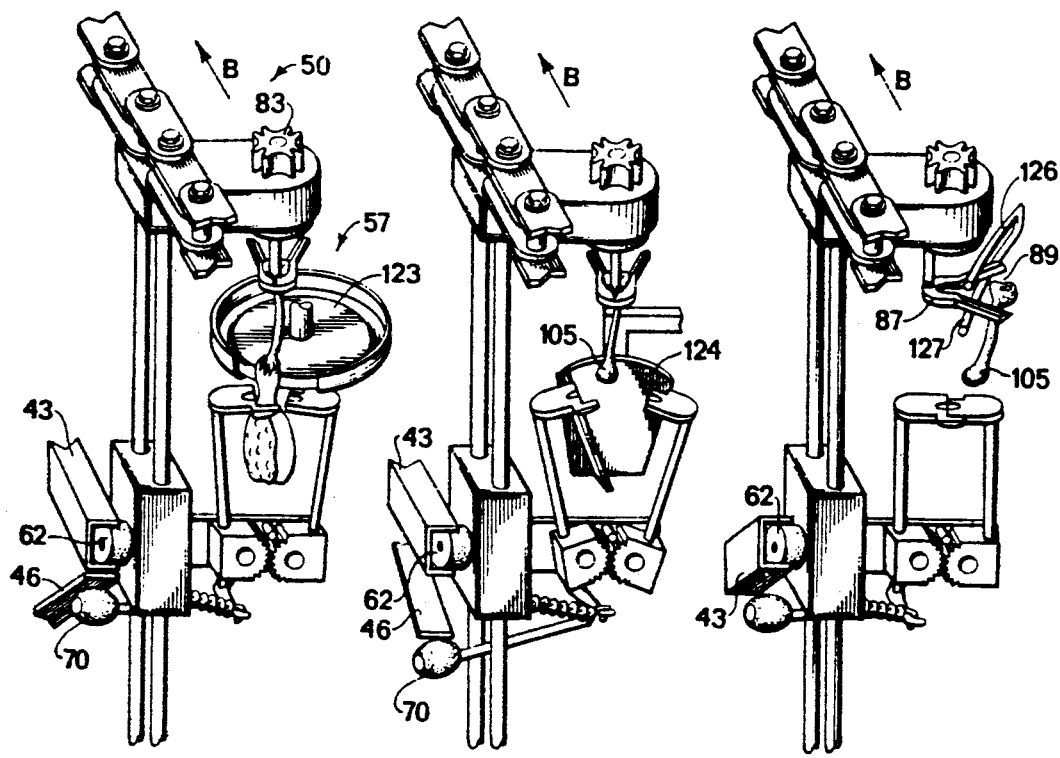

REVOLVING POULTRY THIGH DEBONER

This is a continuation of copending application Ser. No. 07/331,968 filed on Apr. 3, 1989, now abandoned.

FIELD OF THE INVENTION

This invention generally relates to a process and apparatus for removing meat from bones of fowl and animals, and in particular relates to a process and apparatus for deboning poultry thighs by moving the bone of the thigh longitudinally with respect to the meat and stripping the meat from the bone.

BACKGROUND OF THE INVENTION

When removing the meat of the poultry thigh from its bone, a common procedure is to strip the meat from the bone by scraping with a tool along the length of the bone. For example, two or more blades having notches therein are moved into contact with the meat and the bone, with the notches of the blades straddling the bone, and the bone is then pulled through the notches of the blades. This longitudinal movement of the bone with respect to the blades causes the blades to scrape the meat along the length of the bone and finally off the end of the bone. Usually, the meat remains in a single mass after the meat has been stripped from the bone. Examples of this stripping type of meat removal from a bone are found in U.S. Pat. Nos. 3,672,000, 4,327,463, 4,495,675.

One advantage of removing the bone from the meat of an edible fowl is that when the meat is later cooked, the bone does not have to be cooked, which saves energy. Further, if the bone is separated before the cooking process, the bone can be conveniently saved and used for bone meal, etc.

A problem with some of the prior art poultry deboning equipment is that the blades that engage the bone and strip the meat from the bone sometimes inadvertently cause bone fragments to be carried away from the bone in the meat.

Another problem with some of the prior art automated deboning equipment is that the equipment must be manually loaded by placing the poultry thighs in the equipment and permitting the equipment to perform its deboning function while the operator waits for the deboning cycle to be completed before beginning the next loading function. The hand/eye coordination of the operator must be timed with the operation of the equipment with the result that the operator does not have the option to work at a variable pace which sometimes is faster than the movements of the equipment.

SUMMARY OF THE INVENTION

Briefly described, the present invention comprises a deboning process and apparatus for removing meat from the bones of fowl and animals. The embodiment of the invention disclosed herein includes a plurality of deboning modules mounted on a revolving support system whereby poultry thighs and similar bone and muscle parts can be placed in sequence in modules of the apparatus at an operator's station, and as the apparatus revolves meat stripping functions are performed sequentially on each thigh.

Each module of the apparatus includes a rotary bone holder which carries the thigh bone with the module and the rotary bone holder rotates the bone about its own longitudinal axis. A pair of notched stripping blades engage the poultry thigh with the notches straddling the bone and move the blades along the length of the bone as the bone is rotated so as to strip the meat from the bone. As the meat is being stripped from the bone, the meat and the bone are twisted relative to each other. This bone versus meat twisting action tends to enhance the meat removal function of the system.

Therefore, it is an object of this invention to provide an improved meat deboning process and apparatus whereby poultry thighs and similar meat and bone animal/fowl products can be expediently and reliably deboned.

Another object of this invention is to provide a system and apparatus for deboning poultry thighs and the like which utilizes a revolving arrangement of modules each of which carries a poultry thigh through a series of processing stations as the thigh is deboned.

Another object of this invention is to provide an improved process and apparatus for deboning poultry thighs and the like which functions to rotate the bone with respect to the meat as the meat is stripped from the bone.

Others objects, features and advantages of the present invention will become apparent upon reading the following specification, when taken in conjunction with the accompanying drawings.

BRIEF DESCRIPTION OF THE DRAWINGS

FIGS. 8–16 are perspective illustrations of a portion of the deboner showing a rotary bone holder in one of the modules, and showing the progressive movement of the stripper blades and how the meat is scraped from the poultry thigh.

DETAILED DESCRIPTION

Figures 1, 2:
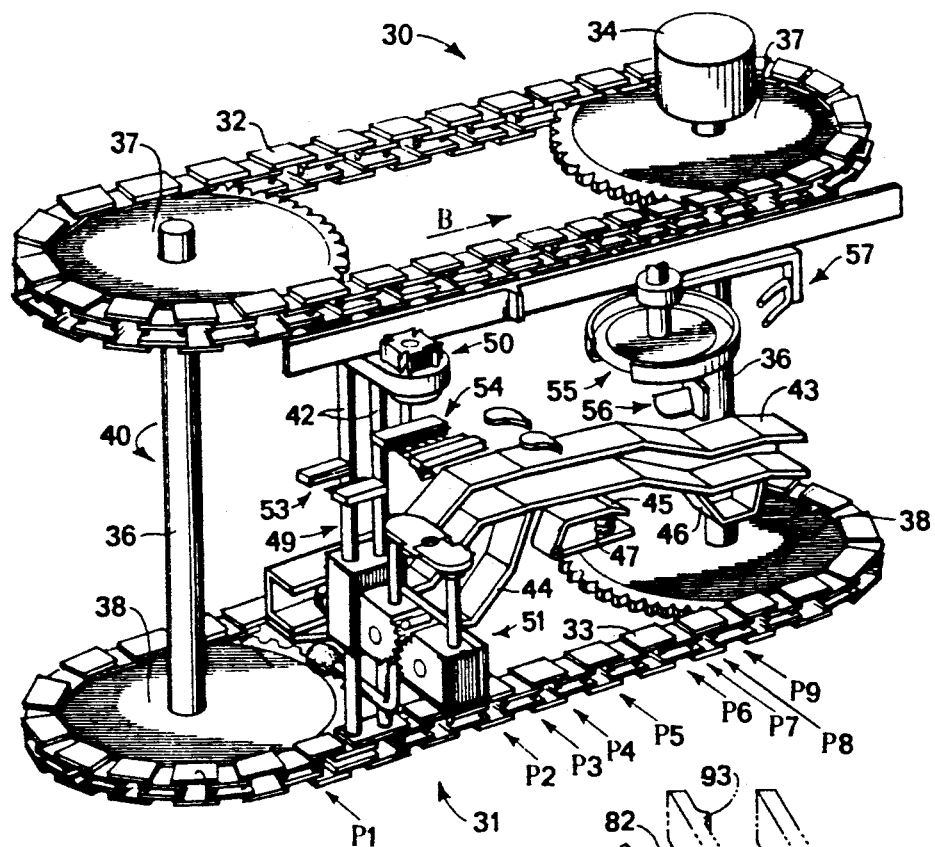
FIG. 1 is a perspective illustration of the operative elements of the revolving deboner, showing only one deboning module mounted thereon for clarity.
FIG. 2 is a perspective illustration of one of the modules of the deboner.

Referring now in more detail to the drawings, in which like numerals indicate like parts throughout the several views, FIG. 1 illustrates the revolving poultry thigh deboner 30 in perspective, with only one deboning module 31 illustrated on the apparatus, with the other deboning modules being removed for clarity. It will be understood that a plurality of deboning modules 31 are positioned at equally spaced positions about the perimeter of the revolving poultry thigh deboner 30, and a plurality of work stations are also positioned about the revolving poultry thigh deboner. Some of the work stations are not illustrated in FIG. 1 for clarity. Much of the support structure is likewise not shown in FIG. 1 for clarity.

The deboner 30 includes a support framework (not shown) with vertical sprocket shafts 36 rotatably supported in the framework. Sprockets 37 and 38 are mounted on the upper and lower ends of the sprocket shafts and upper and lower chains 32 and 33 extend about the upper and lower sprockets respectively. A motor 34 is connected in driving relationship with one sprocket and drives the sprocket and chain system in a counter clockwise direction as indicated by arrow 40.

Deboning modules such as the single module 31 illustrated in FIG. 2, are carried around the deboner 30 in the counter clockwise direction 40 by the movement of the chains 32 and 33.

FIG. 2 shows a deboning module 31 in detail, including a carrier assembly 49, a rotary bone holder assembly 50 and a stripper assembly 51. The carrier assembly 49 comprises a pair of vertical guide bars 42 extending between upper and lower chains 32 and 33. The rotary bone holder assembly 50 is fixedly mounted to an upper portion of the carrier assembly 49 while the stripper assembly 51 is slidably mounted upon the pair of vertical guide bars 42 of the carrier assembly.

Each rotary bone holder assembly 50 includes a bone holder carrier block 81 which is rigidly mounted to upper chain 32. A bone holder block 82 is rigidly mounted to the bone holder carrier block 81. Near one end of the bone holder block 82 is mounted a bone holder sprocket 83. A vertical axle 84 extends through an opening (unshown) in the bone holder block 82. Vertical axle 84 is rigidly mounted at its lower end to the cylindrical support block 86 and is rigidly mounted at its upper end to the bone holder turning sprocket 83. A bone carrier 87 is rigidly attached to the cylindrical support block 86 and includes an upright stem 88 and a receiving yoke 89. Upright stem 88 is offset from the center of the cylindrical support block 86 such that the vertical axis 91 extends through yoke gap 92 in the receiving yoke 89. The receiving yoke 89 is bifurcated and is approximately U-shaped.

Figure 4:
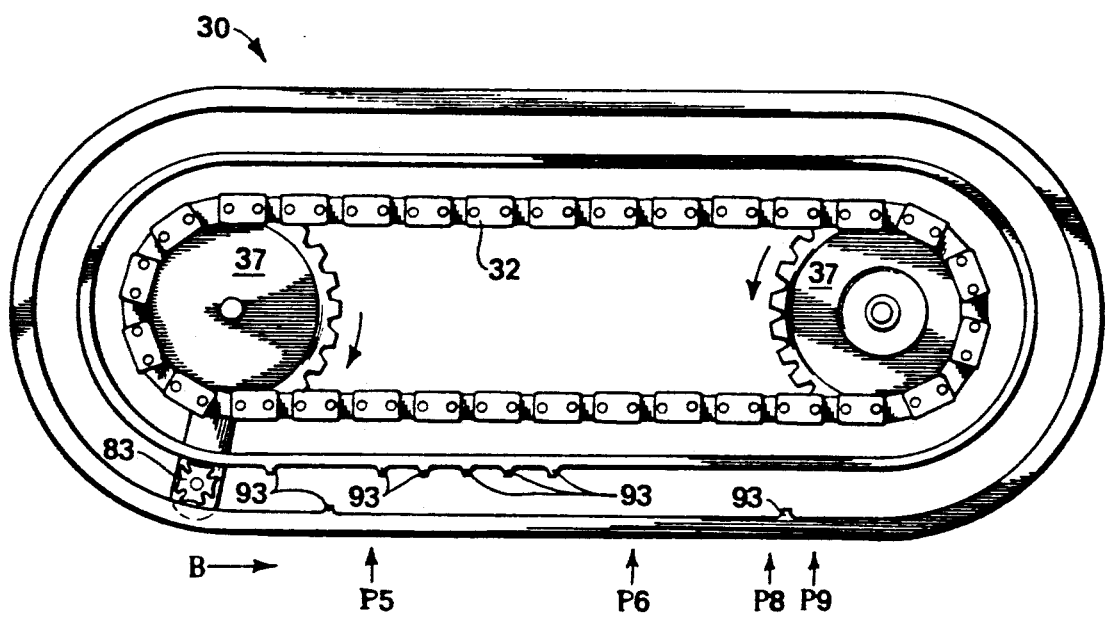
FIG. 4 is a top view of the revolving deboner, showing how the bone holder turning sprocket is engaged by the turning sprocket protrusions.

As illustrated in FIGS. 2 and 4, when each deboning module 31 revolves in a counter-clockwise direction about the deboner 30 in direction B, the bone holder turning sprocket 83 of each module engages turning protrusions 93 in selected positions. Each turning protrusion 93 causes sprocket 83 to rotate 90 degrees as the sprocket moves past the protrusion. By selectively placing the protrusion 93 in the path of sprocket 83 on one side or the other of the vertical axis 91 about which the sprocket rotates, the sprocket is caused to rotate either in a clockwise direction or in a counter-clockwise direction as required. Each time the turning sprocket 83 moves into engagement with a sprocket turning protrusion 93, the sprocket rotates 90 degrees, which results in the rotary bone holder 87 rotating 90 degrees as well.

Each deboning module 31 also includes a stripper assembly 51 movably mounted upon the vertical guide bars 42. As illustrated in FIG. 2, each stripper assembly comprises a carrier block 60 that has a pair of vertical openings 61 mounted about vertical guide bars 42. A cam roller 62 is rotatably mounted to carrier block 60 and is received in a stripper module cam track 43. Thus, as the stripper assembly 51 revolves about the deboner 30 the cam roller 62 follows the cam track 43 to raise and lower the stripper assembly upon the guide bars 42.

Stripper block 63 is rigidly mounted to and carried by carrier block 60. Blade support arms 67 and 68 each are rigidly mounted at their upper ends to stripper blades 65, 66, and each blade support arm is rigidly mounted at its lower end to a half gear 71, 72. Each half gear is pivoted about a pivot pin 73, 74 with the pivot pins 73, 74 being mounted to stripper block 63. The half gears 71, 72 have teeth 77, 78 which engage the opposite half gear 72, 71. With this arrangement, when stripper blade 65 pivots away from the opposite stripper blade 66 about its horizontal axle 73, its half gear 71 will tilt the opposite half gear 72 and its stripper blade in the opposite direction. Likewise, when a stripper blade moves back toward engagement with the opposite stripper blade, the gears 71 and 72 cause corresponding movement of the opposing stripper blade.

Stripper block 63 is shaped so as to receive blade support arms 67 and 68 and half gears 71 and 72, with enough space being formed within the stripper block to accommodate the tilting movement of elements. Springs, such as a pair of coil tension springs 79, are connected at their ends to carrier block 60 and the lower end of blade support arm 67 to urge the stripper blades 65 and 66 toward engagement with each other. A guard pin 76 is mounted above the teeth 77, 78 to prevent meat scraps and debris from fouling the gear teeth.

Cam arm 69 is rigidly mounted at one end to first half gear 71 and extends beneath and beyond carrier block 60 and between vertical guide bars 42. Cam follower 70 is mounted on the other end of cam arm 69.

As illustrated in FIGS. 1 & 2, first, second and third stripper blade cam tracks 44, 45 and 46 are positioned below stripper module cam track 43 for causing cam follower 70 to move vertically relative to carrier block 60 of the stripper assembly 51. As the stripper assembly 51 revolves about the thigh deboner, the cams work to raise and lower the follower relative to the carrier block 60, which causes the stripper blades 65 and 66 to open and close. As best seen in FIG. 1, second cam 45, which works to close the stripper blades 65, 66, is pivotably mounted at one end and attached to a coil spring 47 at an opposite end. This arrangement allows the cam to operate with some amount of compliance when closing the blades.

Figure 3:
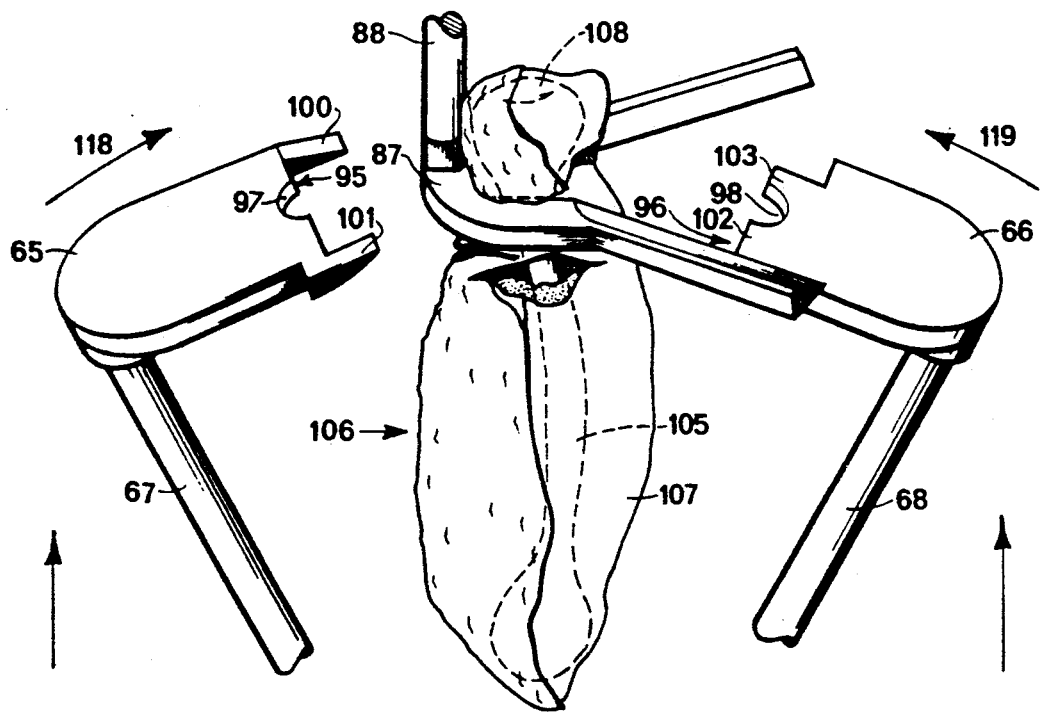
FIG. 3 is perspective illustration of the stripper blades.

As illustrated in FIGS. 2 and 3, the stripper blades 65 and 66 have complementary shaped facing edges 95 and 96. Stripper blade 65 includes a central half opening or recess 97 while stripper blade 66 includes a similar half opening or recess 98, which, when moved together form a circular opening. Outer protrusions 100 and 101 of stripper blade 65 fit about inner protrusions 102 and 103 of stripper blade 66 when the blades move together. This tends to lock the blades in a precise fit when they move together about bone 105 of a poultry thigh 106, with the blades 65 and 66 being locked together above substantially all of the meat 107 of the poultry thigh.

FIGS. 8-16 illustrate the functions of the deboning modules 31 as the modules progress through the processing path about the thigh deboner 30. FIGS. 8-16 correspond to positions P1 through P9 as indicated on FIG. 1.

Located between positions P1 and P2 in FIG. 1 are a first and second pair of cutting stations 53 and 54. A rotary disk cutting station indicated at 55 and meat transfer member indicated at 56 are located between positions P7 and P9. A bone ejection station indicated generally at 57 is located in the vicinity of position P9.

Figure 5:
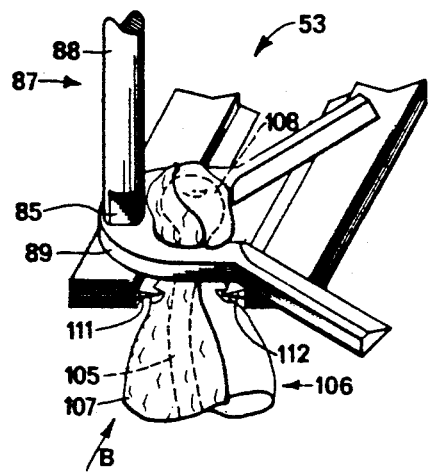
FIG. 5 is a perspective illustration of a rotary bone holder and a poultry thigh mounted therein as the poultry thigh is carried through a first cutting station.
Figure 6:
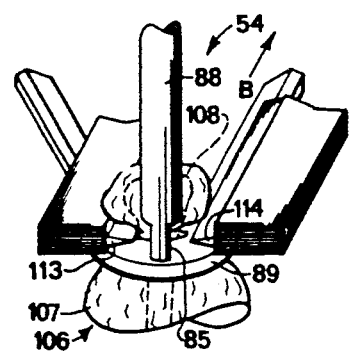
FIG. 6 is a perspective illustration of the rotary bone holder and second set of cutting blades, showing how the poultry thigh is carried by the rotary holder through the second set of blades.
Figure 7:
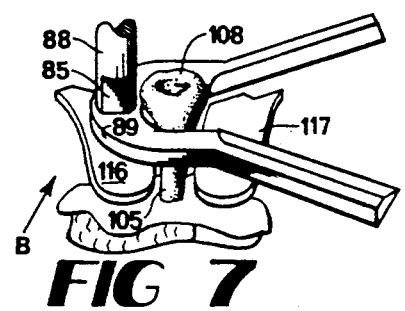
FIG. 7 is a perspective illustration of the rotary bone holder, showing a poultry thigh mounted therein and showing how the strips work to push the meat away from one end of the bone a short distance.

As illustrated in FIGS. 5, 6 and 7, first cutting station 53 is positioned in the path of travel of the bone carrier 87 as the bone carrier moves a thigh 106 in the direction as indicated by arrow B. Cutting station 53 includes a pair of cutting blades 111 and 112 that are spring urged toward the path of the poultry thigh 106. As illustrated in FIG. 5, cutting blades 111 and 112 are located at an elevation just below the bone receiver yoke 89 of the bone carrier 87. With this arrangement, cutting blades 111 and 112 cut through the meat 107 and muscles of the poultry thigh 106 just below the upper knuckle 108 of the thigh bone 105.

As shown in FIG. 6, a second cutting station 54 includes a set of similar cutting blades 113 and 114 which are positioned just beyond cutting blades 111 and 112 in the path of the poultry thigh 106, and blades 113 and 114 are located just above the yoke 89 of bone carrier 87. It will be noted that bone carrier 87 and the poultry thigh 106 have rotated 90 degrees when moved from the position of FIG. 5 to the position of FIG. 6, so that the cutting blades 113 and 114 cut in the areas of the meat and muscles adjacent the upper end of the bone of the poultry thigh that was not previously cut by blades 111 and 112. Upright stem 88 has notches 85 in a lower portion adjacent bone carrier receiving yoke 89 to allow the cutting blades 113 and 114 to cut the meat while avoiding contact with the upright stem.

Positioned just below and extending beyond cutting blades 113 and 114 are a pair of strips 116 and 117 which are inclined downwardly for a short distance in the direction of travel indicated by arrow B of the thigh 106 and which tend to push the meat downwardly away from the upper knuckle 108 of the thigh bone 105 and make a space for the stripper blades 65 and 66 to reach the bone 105.

OPERATION

When the revolving poultry thigh deboner 30 (FIG. 1) is in operation, its motor 34 causes the upper and lower chains 32 and 33 to be driven by the upper and lower sprockets 37, 38 and causes the chains to rotate in the counter-clockwise direction as indicated by arrow 40. An operator (not shown) retrieves poultry thighs from a supply and places each poultry thigh in a rotary bone holder 50 of each revolving deboning module 31. As best seen in FIGS. 2 and 5, the poultry thigh is mounted in the bone holder 50 by inserting the upper knuckle 108 of the bone into the gap 92 of the bone receiving yoke 89, with the yoke supporting the upper knuckle 108 of the poultry thigh. Thus, each poultry thigh is firmly supported in and suspended beneath the bone carrier 87.

Figures 8, 9, 10:
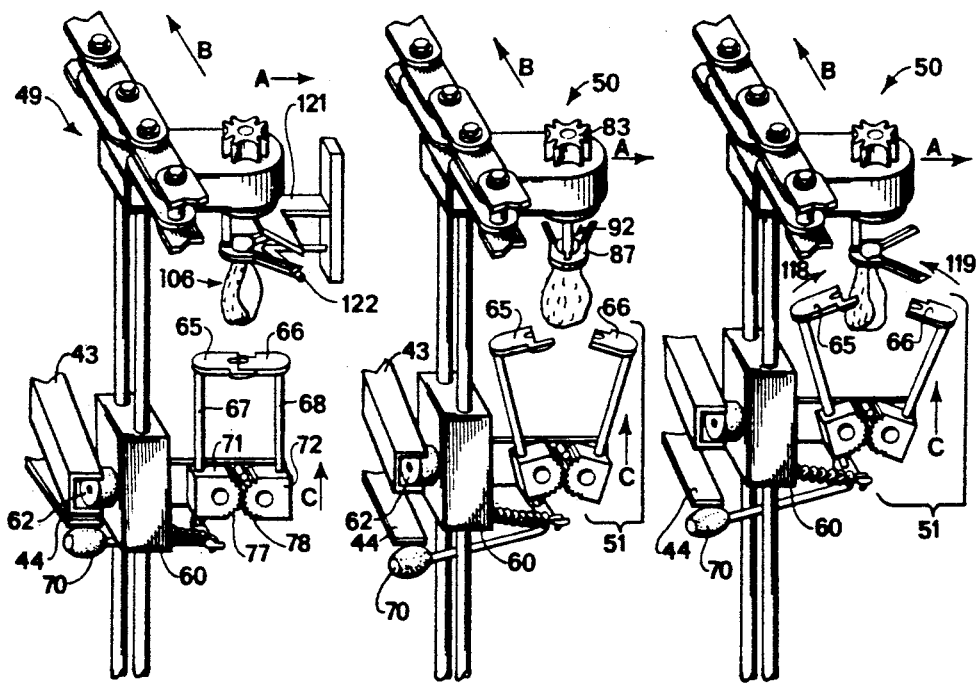

As the modules of the poultry thigh deboner 30 revolve about the apparatus, each poultry thigh 106 is moved along a processing path through a series- of processing positions indicated generally at P1 through P9 in FIG. 1. As illustrated in FIGS. 1 and 8, as the deboning module 31 carrying a poultry thigh 106 moves into the position indicated at P1 the poultry thigh 106 is urged further into the yoke gap 92 of the bone carrier 87 by means of a pair of ramps 121 and 122. As the deboning module 31 moves through the first position indicated at P1 as shown in FIG. 8, the U-shaped opening or gap 92 of the receiving yoke 89 is oriented away from the guide rods 42 in the general direction indicated by arrow A and the stripper assembly 51 is located in a lowered positioned with the stripper blades in a closed position. As the module passes position P1 the cam roller 62 of the carrier block is forced upwardly in the direction of C by the cam track 43. At the same time, first cam surface 44 urges the cam follower 70 protruding from beneath carrier block 60 downwardly thereby causing the first gear half 71 to rotate in a counter-clockwise direction. The teeth 77 on the gear 71 engage the teeth 78 on the second half gear 72 to cause half gear 72 to rotate the same amount in a clockwise direction. This causes the blade support arms 67 and 68 to open up, moving the stripper blades 65 and 66 apart from one another.

Referring now to FIGS. 1 and 9, as the deboning module progresses from position P1 to position P2 the stripper blades 65 and 66 continue to open up while the entire stripper assembly 51 continues to move upwardly in the direction of C toward the rotary bone holder assembly 50. Between positions P1 and P2 the rotary holder engages a first cutting station 53, as seen in FIG. 5. A pair of stationary knife blades 111 and 112 cut the skin of the thigh 106 as the rotary bone holder progresses past the station 53 in the direction of B. As the module progresses in the direction of B toward position P2, the bone holder sprocket 83 engages a bone holder turning protrusion 93 which causes the sprocket to rotate in a counter-clockwise direction, leaving the bone carrier 87 oriented with the opening or gap 92 aligned with arrow B. After the receiving yoke 89 has been turned in the direction of B, the rotary bone holder assembly engages a second cutting station 54, as indicated in FIGS. 1 and 6. Second cutting station 54 operates to cut the skin of the thigh 106 above the plane of the receiving yoke 89. This is made possible by notches 85 in the lower portion of the upright stem 88, at the point where the stem attaches to the receiving yoke 89, providing clearance for the cutting blades 113 and 114 to cut the skin while avoiding contact with the stem 88. Shortly after engaging the second cutting station 54, the deboning module 31 engages another bone holder sprocket turning protrusion 93 which causes the bone holder sprocket 83 to rotate in a clockwise direction, leaving the receiving yoke 89 facing out in the direction of A. As the module approaches position P2 the poultry thigh 106 engages as pair of strips or ramps 116 and 117, which work to force or push the meat 107 of the thigh down and away from the receiving yoke 89, providing a space for the stripper blades to engage the poultry thigh 106. (See FIG. 7)

Figure 17:
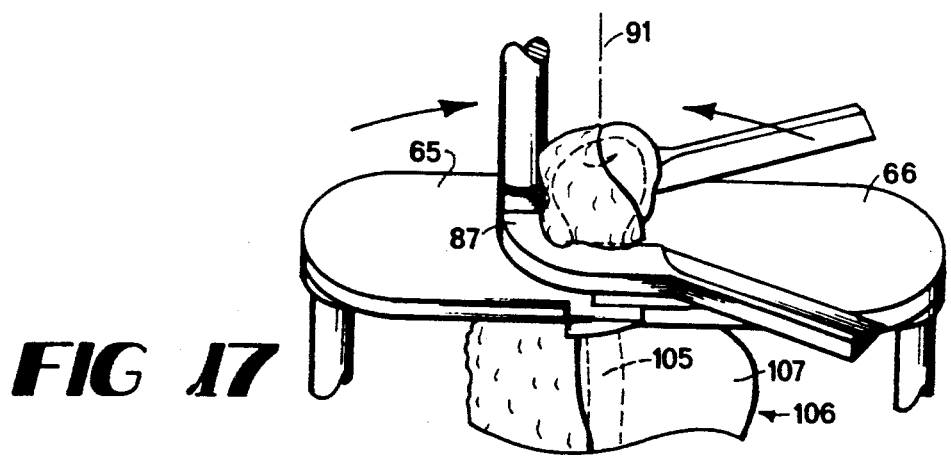
FIG. 17 is a perspective illustration of the rotary bone holder and stripper blades showing how the stripper blades move into engagement with a poultry thigh.

As the deboning module approaches position P3, the stripper assembly 51 continues to approach the rotary bone holder assembly 50. The first cam surface 44 begins to allow the cam follower 70 to close the stripper blades 65 and 66 in the directions indicated by arrows 118, 119 of FIGS. 3 and 10. This action continues until the stripper assembly 51 reaches its zenith as indicated in position P4 of FIG. 11 At this juncture, the stripper blades 65 and 66 are closed upon the poultry thigh 106. As best seen in FIG. 17, the blades 65 and 66 will be substantially closed around the bone 105 of the poultry thigh 106, in a position just below the bone carrier 87.

Figure 18:
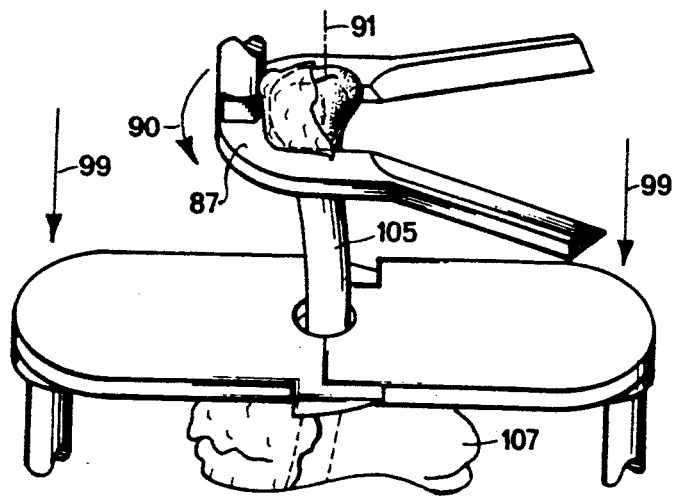
FIG. 18 is a perspective illustration of the rotary bone holder and stripper blades, showing the movement of stripper blades down the bone of the poultry thigh and how the meat is scraped as the bone is rotated.

Referring now to FIGS. 12 and 13, as the deboning module moves towards position P6, the second cam surface 45 urges the cam follower 70 upwardly, thereby working to close the stripper blades 65 and 66 about the poultry thigh 106 and to keep them closed. The compliance provided by spring 47 allows cam surface 45 to close the blades about the thigh while avoiding fragmenting the bone. As the module moves from position P5 toward position P6, the cam track 43 causes the stripper assembly 51 to descend in the direction indicated by arrows 99 by forcing the cam roller 62 downwardly. This downward motion causes the stripper blades 65 and 66 to begin to pull the meat 107 off of the thigh bone 105, exerting forces on the blades which tends to cause them to open. This opening of the blades is prevented by the second cam surface 45 acting upon the cam follower 70, as noted above. At the same time the bone holder sprocket 83 engages a series of sprocket turning protrusions 93, which cause the bone holder sprocket to rotate in a counter-clockwise direction indicated at arrow 90. (See FIGS. 12 and 18). This rotation continues while the stripper assembly descends and the blades 65 and 66 continue to pull the meat 107 off of the bone 105.

Figure 19:
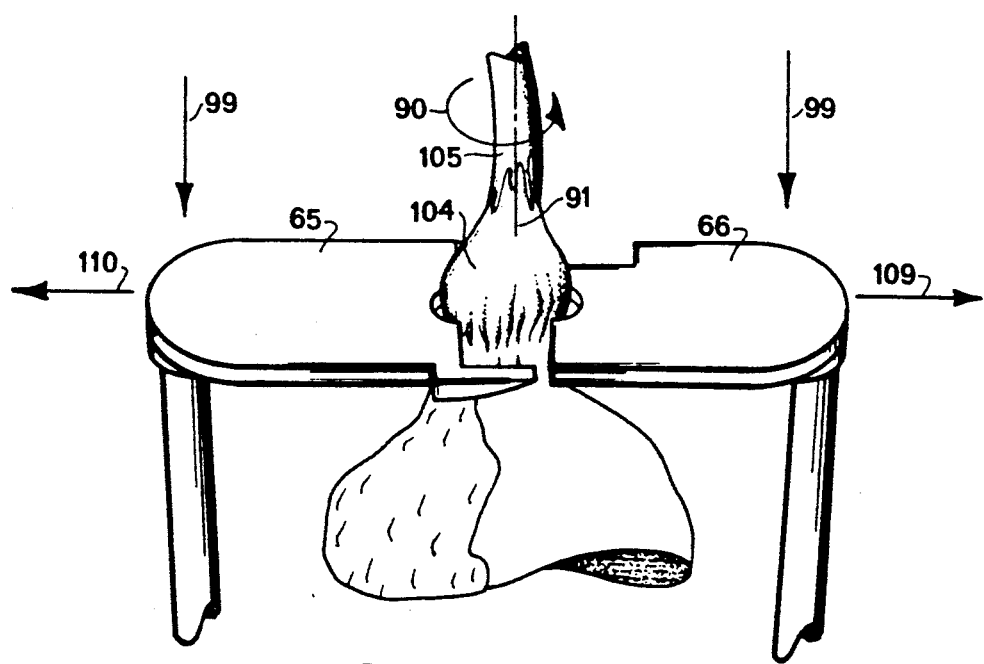
FIG. 19 is a perspective illustration of the stripper blades showing how the stripper blades spread apart slightly to slip over the large lower knuckle of the poultry thigh bone.

As best seen in FIG. 19, as the stripper blades 65 and 66 engage the lower knuckle 104, which is of larger diameter than the intermediate portion of the thigh bone 105, the spring 79 of FIG. 2 permits the stripping blades 65 and 66 to move away from each other slightly as indicated by the arrows 109 and 110, and then back toward each other, so that the downward movement of the stripping blades as indicated by arrows 99 is not impeded.

With the stripping blades 65 and 66 moved beyond the lower knuckle 104 of the thigh bone 105, the meat 107 of the thigh is substantially stripped from the thigh bone, with a small portion of meat and tissue extending from the lower knuckle to the stripper blades. As the module 31 approaches position P7, it engages a rotary disk cutting station indicated at 57 (See FIG. 1 and FIG. 14). A rotary disk cutting blade 123 is positioned in the path B of the poultry thigh at a level just beneath the lower knuckle 104 of the bone 105 and cuts any portion of the meat 107 that remains clinging to the bone 105. This completely separates the meat from the bone of the poultry thigh. The meat 107 is then permitted to drop onto a waiting collector, such as a belt conveyor, and the meat is transported away from the revolving poultry thigh deboner. Any meat which remains attached to the stripper blades 65 and 66 is then swept off of the stripper blades by meat sweeping member 124 as the deboning module moves past. (See FIG. 15). This is accomplished by opening up the stripper blades 65 and 66 by the action of the third cam surface 45, which allows the meat then to begin to fall and to be engaged by the meat sweeping member 124 which acts similar to a plow.

Between positions P5 and P6 the rotary bone holder is rotated one full revolution plus 90 degrees counterclockwise, with the result that the yoke 89 of the rotary bone holder is facing in the direction of B when the rotary bone holder approaches positions P7 and P8. Between positions P8 and P9 the bone holder sprocket 83 is once again turned 90 degrees clockwise to orient the receiving yoke 89 to be facing out in the direction of A as indicated in FIG. 16. As the module progresses through position P9, a pair of stationary bone engagement rods 126 and 127 engage the poultry thigh bone 105 and remove it from the receiving yoke 89 of the bone carrier 87. The bones 105 can then be collected and transported away from the revolving poultry thigh deboner.

The bones of poultry thighs are curved, and each thigh is supported in the rotary bone holder assembly 50 with their bones 105 in a substantially upright attitude. The bones are each rotated about their length as the stripper blades 65 and 66 engage the poultry thigh and move along the length of the bone. This combined scraping and turning action about the bone tends to effectively remove the meat from the bone even though the bone is curved.

Although the invention has been disclosed as a system and apparatus for deboning poultry thighs, it will be understood that the invention will be useful in the deboning of other fowl and animal products.

It will be understood that the foregoing relates only to a preferred embodiment of the present invention, and that numerous changes and modifications may be made therein without departing from the spirit and scope of the invention as set forth in the following claims:

We claim:

1. A method of deboning poultry thighs or the like comprising the steps of grasping a thigh bone at a first knuckle with a bone holder; cutting the skin, meat or tissue near the one end of the bone adjacent the first knuckle after grasping the thigh bone; moving the skin meat or tissue away from the first knuckle after cutting the skin, meat or tissue; engaging the thigh bone adjacent the first knuckle with meat stripper means; moving the thigh bone and the meat stripper means with respect to each other along the length of the thigh bone until the meat stripper means passes over the other knuckle of the thigh bone; cutting the meat adjacent the other knuckle to separate the meat from the bone; wherein the bone holder and the thigh are moved along a processing path through a series of processing stations, and the thigh bone is rotated about its length with respect to the meat and the meat stripper means as the thigh bone and the meat stripper means move with respect to each other along the length of the thigh bone.

2. The method of claim 1 and further characterized by the steps of:
    moving the other knuckle of the thigh bone and the stripper means adjacent a meat cutting means after the stripper means has passed over the knuckle; and
    cutting with the cutting means any meat extending from the thigh bone toward the stripper means.

3. The method of claim 1 and wherein the step of grasping the thigh bone adjacent the first knuckle of the thigh bone comprises inserting the thigh bone into the opening of an approximately U-shaped thigh bone holder, and wherein the step of rotating the thigh bone comprises rotating the bone holder.

4. The method of claim 1 and wherein the step of engaging the thigh bone with the meat stripper means comprises moving a pair of meat stripper blade members toward each other and into engagement with the thigh on opposite sides of the thigh, the meat stripper blade members each having a notch for together substantially surrounding the bone.

5. A method of deboning poultry thighs or the like meat/bone surrounded with meat comprising the steps of:

inserting a meat/bone product at a first one of its ends into a bone holder;

moving the meat/bone product and the bone holder along a processing path;

as the meat/bone product is moved along the processing path, moving the notched edges of a pair of stripper members toward each other about the one end of the bone to position the notches about the bone to substantially surround the bone with the stripper members to engage the bone with the meat stripper members;

moving the bone and the meat stripper means longitudinally with respect to each other along the length of the bone until the meat stripper means reaches the other end of the bone and substantially removes the mat from the bone;

6. The method of claim 5 further characterized by the step of rotating the bone holder as the bone holder moves along the processing path so as to rotate the bone with respect to the meat as the bone and the meat stripper means move longitudinally with respect to each other.

7. The method of claim 5 wherein the step of moving the bone and the meat stripper means longitudinally with respect to each other along the length of the bone is characterized by moving the meat stripper means beyond the end of the bone to separate the meat from the bone and further including the step of cutting any meat clinging from the separated meat to the bone.

8. The method of claim 5 further comprising the step of moving the skin, meat or tissue away from the one end of the bone after the step of cutting the skin, meat or tissue near the one end of the bone and prior to the step of engaging the bone with meat stripper means.

9. Apparatus for removing meat from an elongated bone of a poultry part or the like comprising a bone holder for grasping one end of a bone;

cutting means arranged to cut the meat and the muscles of the poultry part grasped and supported by said bone holder; stripper means for engaging and pushing the meat along the length of and off the bone; and means for rotating said bone holder as said stripper means moves away from said bone holder so as to rotate the bone with respect to the meat as the meat is pushed from the bone.

10. The apparatus of claim 9 and further including means for moving said bone holder and said stripper means along a processing path as said bone holder is rotated.

11. Apparatus for separating meat from its bone of a poultry part such as a thigh and the like comprising;

a support system;

a bone holder for supporting an elongated bone adjacent one end thereof and stripper blades for engaging the meat of the bone adjacent the bone holder, said stripper blades being adapted to move away from the bone holder along the length of the bone to strip the meat from the bone, said bone holder and said stripper blades being mounted as an operating module on said support system;

power means for moving said support system and revolving said operating module through a processing path;

cutting means positioned along a portion of the processing path for cutting the meat and the muscles of the poultry part adjacent said bone holder; and cam means for moving said bone holder and stripper blades toward and away from each other in response to the revolving of said operating module through the processing path.

12. The apparatus of claim 11 and further comprising said cam means including a cam track mounted on said support system and a cam follower for engaging said cam track and moving said stripper blades with respect to said bone holder, and said bone holder and said support system including cam means for rotating said bone holder in response to the movement of said support system.

13. A method of deboning poultry thighs or the like comprising the steps of grasping a thigh bone at a first knuckle with a bone holder; engaging the thigh adjacent the first knuckle with meat stripper means; and moving the thigh bone and the meat stripper means with respect to each other along the length of the thigh bone until the meat stripper means passes over the other knuckle of the thigh bone and separates the meat from the bone; characterized by moving the bone holder and the thigh along a processing path through a series of processing stations, and by rotating the thigh bone about tis length with respect to the meat and the meat stripper means as the thigh bone and the meat stripper means move with respect to each other along the length of the thigh bone;

said method further comprising the step of cutting the skin, meat or tissue near the first knuckle prior to the step of engaging the thigh with the meat stripper means.

14. The method of claim 13 further comprising the step of moving the skin, meat or tissue away from the first knuckle after the step of cutting the skin, meat or tissue near the first knuckle and prior to the step of engaging the thigh with meat stripper means.

* * * * *